United States Patent [19]

Kito et al.

[11] Patent Number: 5,705,910
[45] Date of Patent: Jan. 6, 1998

[54] ELECTRIC CHARGE/DISCHARGE CONTROL DEVICE AND ELECTRIC CHARGE/DISCHARGE CONTROL METHOD IN A SYSTEM USING THE SAME DEVICE

[75] Inventors: Masaru Kito; Rihei Tokutake, both of Kawasaki, Japan

[73] Assignee: Fujitsu Limited, Kawasaki, Japan

[21] Appl. No.: 519,699

[22] Filed: Aug. 28, 1995

[30] Foreign Application Priority Data

Feb. 15, 1995 [JP] Japan ................................. 7-026798

[51] Int. Cl.⁶ ........................................................ H01M 10/44
[52] U.S. Cl. ........................................... 320/5; 320/39
[58] Field of Search ...................................... 320/5, 13, 14, 320/21, 48, 39, 40; 340/636

[56] References Cited

U.S. PATENT DOCUMENTS

| | | | |
|---|---|---|---|
| 3,997,830 | 12/1976 | Newell et al. | 320/5 |
| 4,709,202 | 11/1987 | Koenck et al. | 320/43 |
| 4,800,328 | 1/1989 | Bolger et al. | 320/2 |
| 4,918,368 | 4/1990 | Baker et al. | 320/40 |
| 5,115,182 | 5/1992 | Ehmke et al. | 320/14 |
| 5,150,031 | 9/1992 | James et al. | 320/2 |
| 5,304,915 | 4/1994 | Sanpei et al. | 320/14 |
| 5,341,083 | 8/1994 | Klontz et al. | 320/2 |
| 5,541,489 | 7/1996 | Dustan | 320/2 |
| 5,548,200 | 8/1996 | Nor et al. | 320/27 |

*Primary Examiner*—Peter S. Wong
*Assistant Examiner*—Gregory J. Toatley, Jr.
*Attorney, Agent, or Firm*—Nikaido, Marmelstein, Murray & Oram LLP

[57] ABSTRACT

A charge/discharge control device having a charge/discharge function for executing communication by connecting a portable terminal equipment, driven by a main cell which is a secondary cell, to a host unit. The charge/discharge control device further has a discharger for discharging the main cell and a charger for charging the main cell upon receipt of an instruction from the host unit.

10 Claims, 12 Drawing Sheets

ELECTRIC CHARGE/DISCHARGE CONTROL DEVICE AND ELECTRIC CHARGE/DISCHARGE CONTROL METHOD IN A SYSTEM USING THE SAME DEVICE

BACKGROUND OF THE INVENTION

1. Field of the Invention

The present invention relates to a device which connects terminal equipment to a personal computer (host unit) to execute data processing such as an adaptor for communication, to an electric charge/discharge control device for secondary cells used for terminal equipment in such a system, and to a charge/discharge control method. Terminal equipment (e.g., portable equipment) is used for reading and collecting data at the moment when the data are produced in such business operations as controlling the stock of goods (issuing orders, stocktaking), etc.

2. Description of the Related Art

An adaptor that connects a portable terminal equipment to a host unit to execute communication has been designed in a shape that fits the portable terminal equipment and can be utilized as a holder for the portable terminal equipment. In many cases, the portable terminal equipment uses a nickel-cadmium cell as a main power source which can be electrically charged repetitively. Therefore, the adaptor for communication also has a function for electrically charging the cells; i.e., when the portable terminal equipment is connected to the adaptor for communication, either communication can be executed to a parent unit or the nickel-cadmium cell, which is a secondary cell, is electrically charged. After the passage of a predetermined period of time, the electric charging is changed over to a trickle charging of a current which is so small as only to compensate for the natural discharge of the cell. In the adaptor for communication, the state of communication or the state of charging is indicated by a lamp.

Here, when the nickel-cadmium cell used for the portable terminal equipment is repetitively charged and discharged in periods of time which are shorter than its rated duration of use, there results such a phenomenon (inactivation) that the cell can be used for only short periods of time. To prevent this inactivation, it is important that the cell is used throughout its fully utilizable duration. To forcibly realize this within short periods of time, there has been developed such a device as a discharger or a charger with a discharge function. However, the adaptor for communication has been provided with neither a discharge function nor an improvement for preventing the secondary cells from being inactivated.

Therefore, when a conventional adaptor for communication is used as a holder for the portable terminal equipment, the above-mentioned inactivation phenomenon takes place when the portable terminal unit is used at a reduced frequency. Moreover, the cell is electrically charged all the time as long as the portable terminal equipment is placed on the adaptor for communication. Therefore, the charging time tends to be lengthened and the cell may be damaged by over-charging.

In using the charging function of the adaptor for communication, furthermore, the charge/discharge operation must be so controlled as will not overlap the regular communication between the portable terminal equipment and the host unit.

In view of specific characteristics of the secondary cells, furthermore, it becomes necessary to control the life of the nickel-cadmium cell which is usually claimed to endure 300 times of charge/discharge cycles. It is further desired that the portable terminal equipment lets the operator know when to renew the cells.

SUMMARY OF THE INVENTION

The first object of the present invention is to suitably control the electric charging and discharging to prevent the main cell from being inactivated by providing a charge/discharge control device with a discharger which is capable of discharging the main cell of the terminal equipment.

The second object of the present invention is to effect the electric charging and discharging according to an instruction from a host unit, so that the electrically charged or discharged state can be controlled by a host unit or by a host computer connected as a high-level host unit.

According to a first aspect of the present invention, there is provided a charge/discharge control device, having a charge/discharge function for charging and discharging a secondary cell by connecting a terminal equipment driven by the secondary cell to a first host unit, comprising a discharger for discharging the secondary cell upon receiving an instruction from the first host unit, and a charger for charging the secondary cell upon receiving an instruction from the first host unit.

According to a second aspect of the present invention, there is provided a charge/discharge control device which is connected to terminal equipment which has a secondary cell, to which a drive power is given from the secondary cell, and electrically charges and discharges the secondary cell, comprising a voltage measuring unit for measuring the voltage of the secondary cell, a discharging unit for discharging the voltage of the secondary cell, and a charging unit for charging the secondary cell. In the charge/discharge control device the voltage of the secondary cell is measured by the voltage measuring unit prior to charging the secondary cell, and when the voltage of the secondary cell is larger than a predetermined voltage, the secondary cell is discharged by the discharging unit and is, then, charged by the charging unit and when the voltage of the secondary cell is smaller than the predetermined voltage, the secondary cell is charged by the charging unit without being discharged by the discharging unit.

According to a third aspect of the present invention, there is provided a charge/discharge control device, having a charge/discharge function for charging and discharging a secondary cell by connecting a terminal equipment driven by said secondary cell to a first host unit. The device comprises a discharger for discharging the secondary cell upon receiving an instruction from the first host unit, and a charge/discharge control unit which discharges the secondary cell by the discharger and, when the voltage of the secondary cell is discharged down to a predetermined voltage, discontinues the discharging and starts the charging and, when the voltage of the secondary cell after the start of charging reaches a predetermined charging voltage, discontinues the charging and informs the first host unit of the completion of charging.

According to a fourth aspect of the present invention, there is provided an adapter for communication having a charge/discharge function for executing communication by connecting a terminal equipment driven by a secondary cell to a first host unit, comprising a discharger for discharging the secondary cell upon receiving an instruction from the first host unit, and a charger for charging the secondary cell upon receiving an instruction from the first host unit.

According to a fifth aspect of the present invention, there is provided a charge/discharge control method in a system having a first host unit, a terminal equipment driven by a secondary cell, and a charge/discharge control device connected thereto. The charge/discharge control method comprises a step for sending an instruction for starting charge/discharge to the charge/discharge control device from the first host unit, a step for starting the discharging of the secondary cell in the terminal equipment by the charge/discharge control device, and a step for terminating the discharging when the voltage of the secondary cell reaches a predetermined voltage after the passage of a predetermined period of time. Further the method comprises a step for starting the charging of the secondary cell following the discharging, a step for terminating the charging when the voltage of the secondary cell reaches a predetermined voltage after the passage of a predetermined period of time, and a step for sending the notice of completion of charge/discharge to the first host unit from the charge/discharge control device after the charging is terminated.

According to a sixth aspect of the present invention, there is provided a charge/discharge control method comprising a step for sending a charge/discharge start instruction to the charge/discharge control device from the first host unit, a step for starting the discharging of the secondary cell in the terminal equipment by the charge/discharge control device, a step for terminating the discharging when the voltage of the secondary cell reaches a predetermined voltage after the passage of a predetermined period of time, and a step for informing the completion of discharging to the first host unit from the charge/discharge control device. Further the method comprises a step for sending an instruction for starting the charging to the charge/discharge control device from the first host unit, a step for starting the charging of the secondary cell by the charge/discharge control device, a step for terminating the charging when the voltage of the secondary cell reaches a predetermined voltage after the passage of a predetermined period of time, and a step for sending the notice of completion of charging to the first host unit from the charge/discharge control device.

According to a seventh aspect of the present invention, there is provided a charging method by which a terminal equipment, which has a secondary cell and to which driving power is provided from the secondary cell, is charged by connecting a charge control device thereto. In the method, in effecting the electric charging by the charge control device, the charge control device checks the number of times of charging effected thus far for the secondary cell in the terminal equipment, electrically charges the secondary cell when the number of times of charging is smaller than a predetermined number of times, adds 1 to the number of times of charging when the charging of the secondary cell is finished, and does not electrically charge the secondary cell when the number of times of charging has reached a predetermined number of time.

According to the present invention, the adaptor for communication having a function for charging the main cell of a portable terminal equipment is provided with a discharging function. It is therefore made possible to prevent the main cell from being inactivated and to use the cell up to its full life span. The present invention further makes it possible to prevent the cell from being over-charged.

The charge/discharge function of the adaptor for communication is so effected, in compliance with an instruction from the host unit, that the charge/discharge operation does not overlap the regular communication sequences between the portable terminal equipment and the host unit. At this moment, furthermore, the number of times of charge/discharge is measured by the host equipment and the main cell is controlled by the host unit to let the operator know the timing for renewing the main cell of the portable terminal equipment. In order that the charge/discharge operation does not overlap the regular communication sequences between the portable terminal equipment and the host unit, the charge/discharge operation of the adapter for communication is inhibited during the communication between the portable terminal equipment and the host unit.

Other features and advantages of the invention will become apparent from the following description with reference to the accompanying drawings.

DESCRIPTION OF THE PREFERRED EMBODIMENTS

Figure 1:
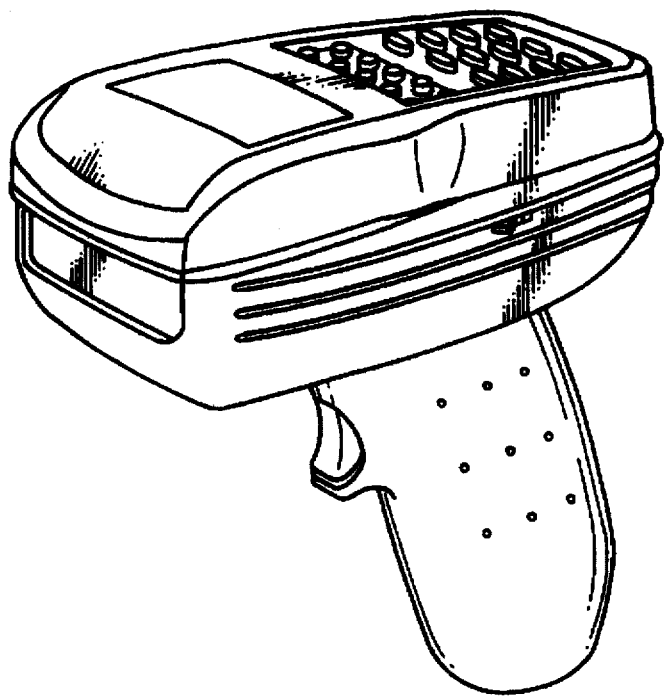
FIG. 1 is a perspective view illustrating a portable terminal equipment.
Figure 2:
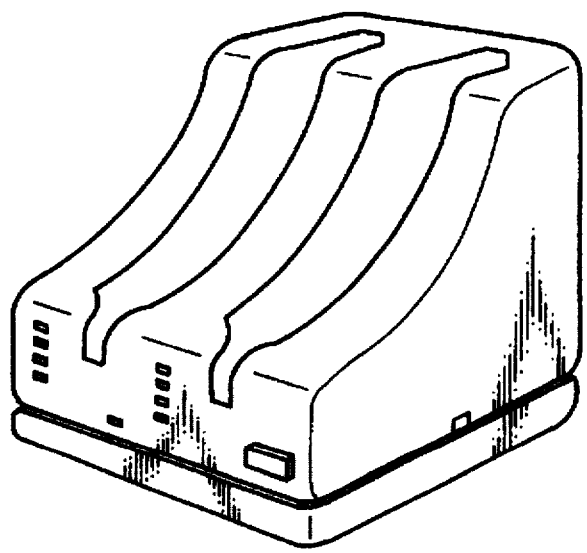
FIG. 2 is a perspective view illustrating an adaptor for communication.
Figure 3:
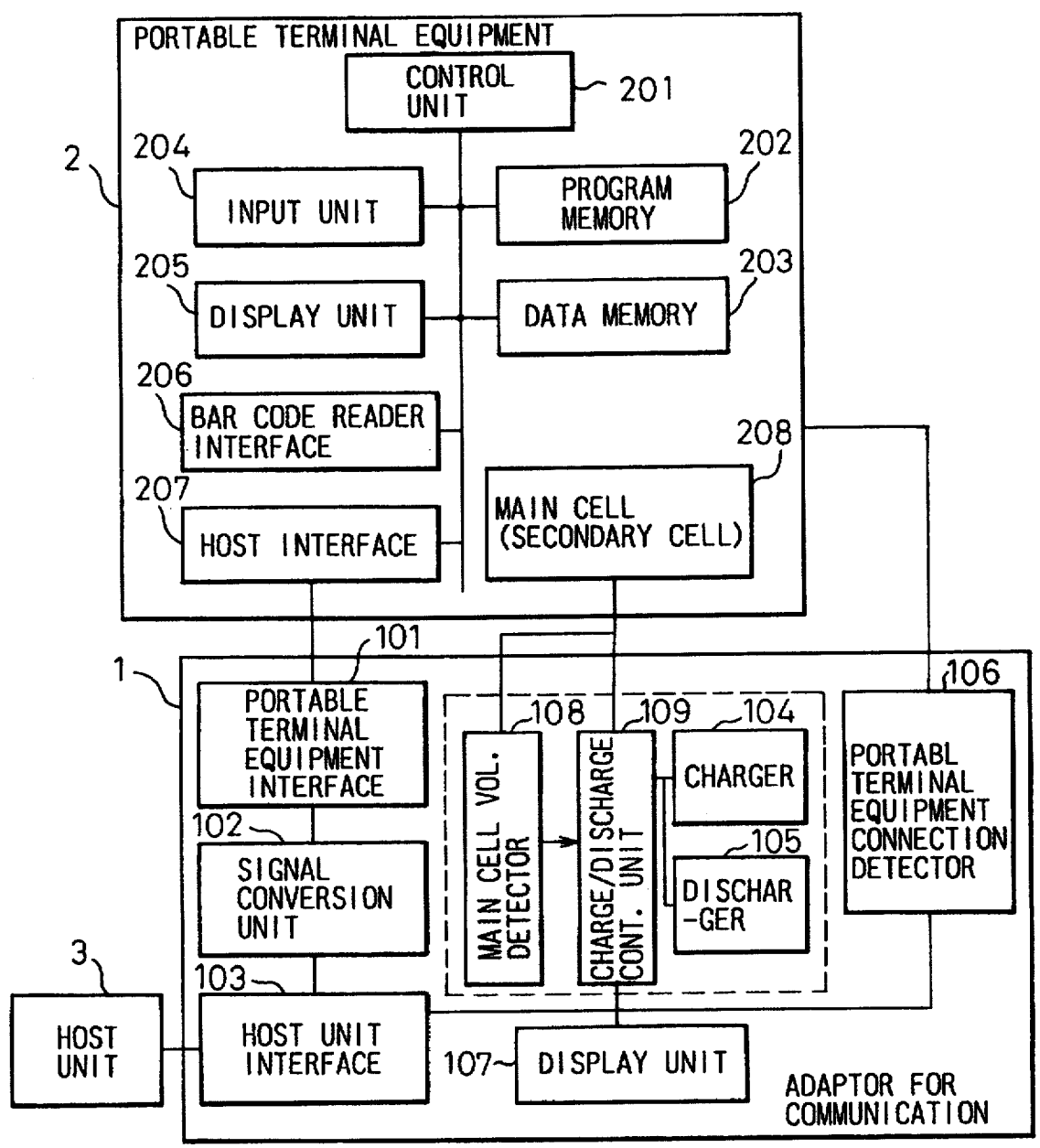
FIG. 3 is a block diagram of an adaptor for communication and a portable terminal equipment of the present invention.

An embodiment of the present invention will now be described with reference to the drawings. FIG. 1 is a perspective view illustrating a portable terminal equipment, FIG. 2 is a perspective view illustrating an adaptor for communication, and FIG. 3 is a block diagram of an adaptor 1 for communication and of a portable terminal equipment (hand-held terminal) 2 according to the present invention. The portable terminal equipment 2 is constituted by a control unit 201, a program memory 202 for storing an operating system (OS) or an application program, a data memory 203 for storing the collected data, an input unit 204 such as keyboard, a display unit 205 using liquid crystals, a bar code reader interface 206 for receiving data from a bar code reader, a host interface 207 for executing communication with a host unit (parent unit) via an adaptor for communication, and a main cell 208 (secondary cell such as nickel-cadmium cell) which is a drive power source.

The adaptor 1 for communication includes a portable terminal equipment interface 101, a signal conversion unit 102, a host unit interface 103, a charger 104, a discharger 105, a portable terminal equipment connection detector unit 106, a display unit 107, a main cell voltage detector unit 108, and a charge/discharge control unit 109.

Keyboard data input through the input unit 204 and bar code data input through a bar code reader (not shown) connected to the bar code reader interface 206 at a site where the data are generated, are stored in the data memory 203. The host interface 207 works to down-load the application program sent from the host unit 3 via the adaptor for communication to the program memory 202, and to transmit the data stored in the data memory 203 to the host unit 3 via the adaptor for communication. In collecting data or in executing communication with the host unit, the display unit 205 displays a guide for operating the portable terminal equipment 2.

The interface 207 of the portable terminal equipment 2 is connected to the portable terminal equipment interface 101 of the adaptor 1 for communication and is further connected to the host unit 3 via signal conversion unit 102 and host unit interface 103. The charger 104 and the discharger 105 work to electrically charge and discharge the main cell 208 of the portable terminal equipment 2.

The portable terminal equipment connection detector unit 106 detects whether the portable terminal equipment 2 is firmly connected to the adaptor 1 for communication or not. When it has not been firmly connected, the portable terminal equipment connection detector unit 106 so works that neither the communication nor the charge/discharge operation be effected. The display unit 107 displays the operation condition of the terminal equipment during the communication, charging or discharging. The adaptor for communication is provided with a protruded switch. When the portable terminal equipment is placed so as to execute communication or so as to be electrically charged, the switch is depressed, and the connection between the devices can be confirmed.

In this constitution, the main cell 208 in the portable terminal equipment 2 may be charged or discharged according to the instruction from the host unit 3, so that the charging or the discharging will not overlap the regular communication between the portable terminal equipment 2 and the host unit 3. After the discharging, the cell cannot be used many times again due to over-discharge, and needs to be charged again instead of being left to stand without being charged. When the discharge function is selected, therefore, the cell is automatically charged again after it is discharged for a predetermined period of time.

Figure 12:
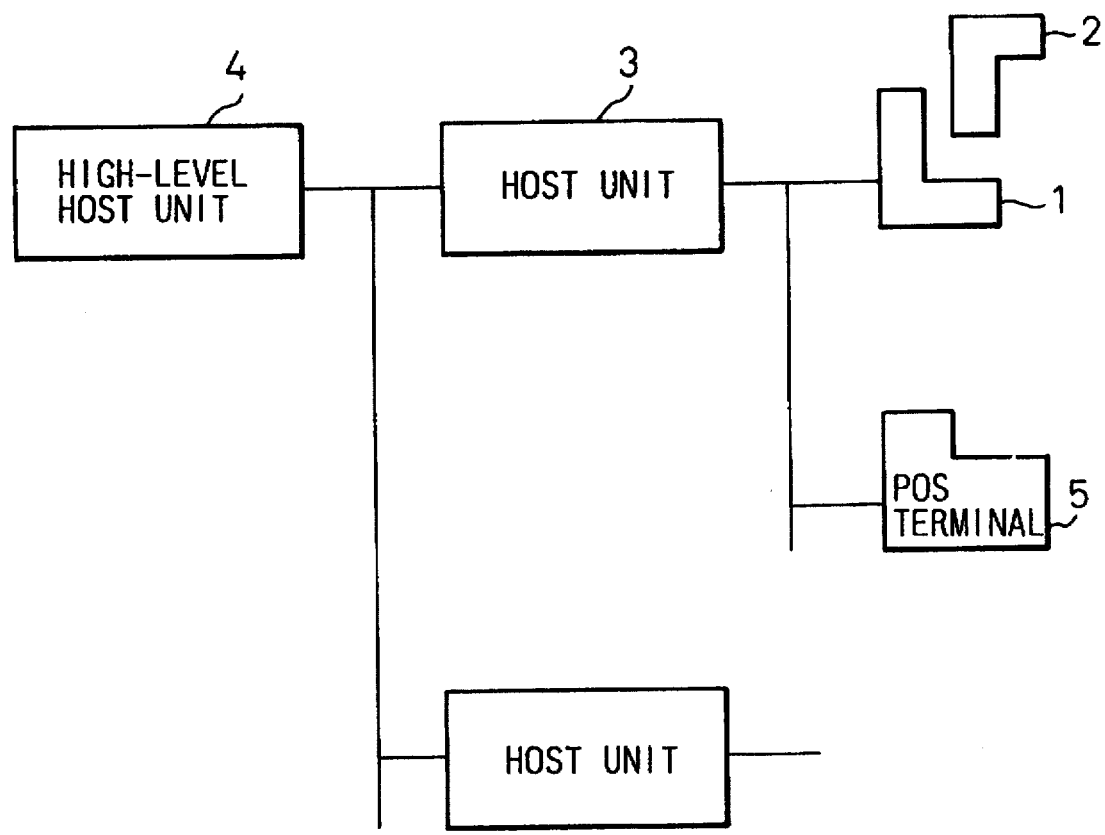
FIG. 12 is a block diagram of a system to which the present invention is adapted.

FIG. 12 illustrates the constitution of a system to which the method of the present invention is adapted. At a shop, the adaptor 1 for communication holding the portable terminal equipment 2 and a POS (point-of-sales data management) terminal 5 are connected to the host unit 3 such as personal computer. Here, the portable terminal equipment 2 can be removed from the adaptor 1 for communication and can be carried. The host unit 3 installed at a shop is connected to a host unit 4 installed in a headquarter office through a telephone circuit or the like circuit.

Figure 4:
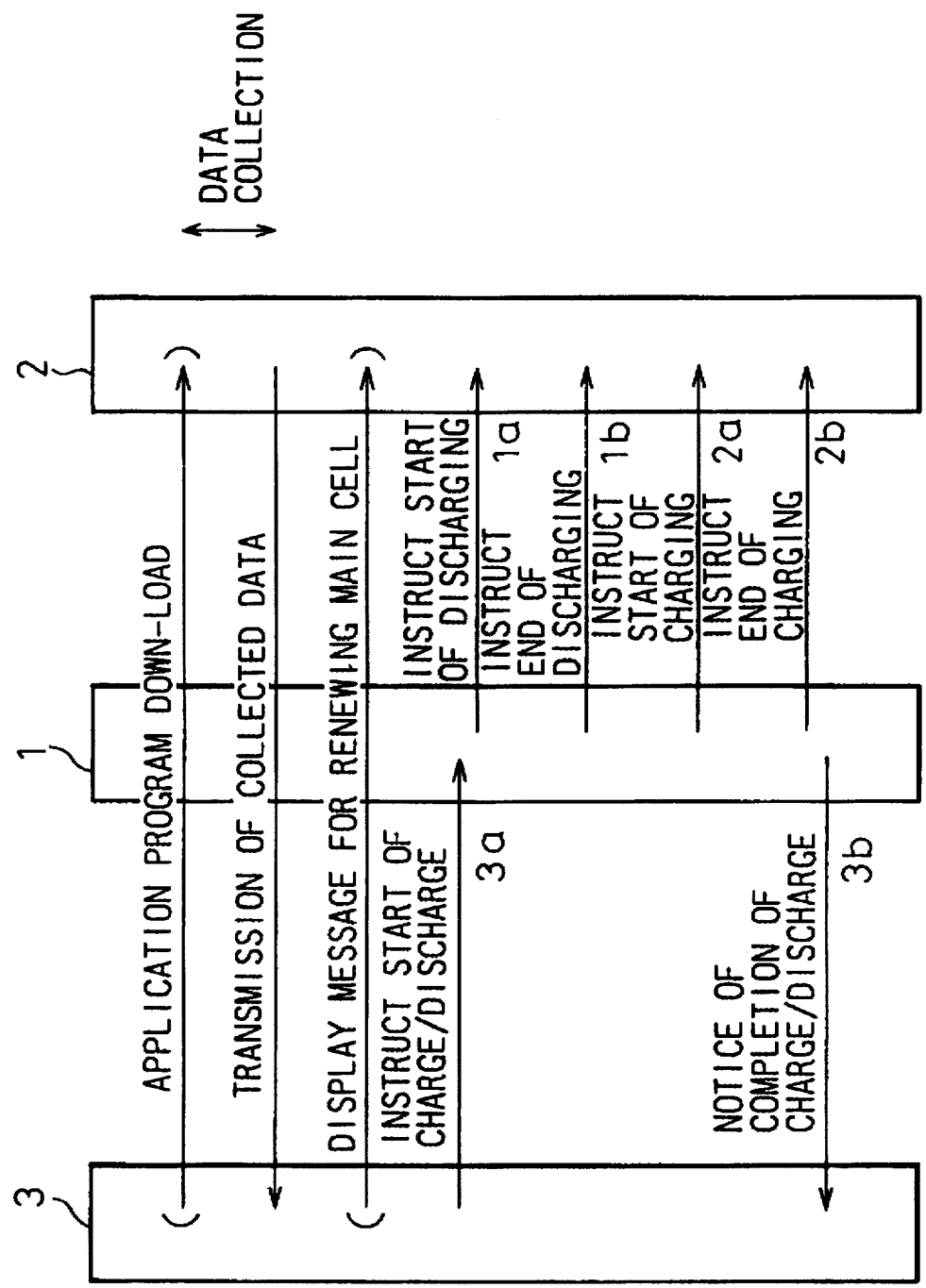
FIG. 4 is a diagram explaining charge/discharge processing and regular communication according to a first embodiment of the present invention.

FIG. 4 is a diagram illustrating sequences of charge/discharge processing and regular communication between the portable terminal equipment and the host unit according to a first embodiment of the present invention. That is, the upper three stages represent regular communication, and the lower stages represent a processing for controlling the charge/discharge operation from the host unit 3. In the regular communication, the application program is down-loaded (which is often emitted) from the host unit to the terminal equipment, and the collected data are transmitted from the terminal equipment to the host unit. When the communication is interrupted and an instruction for starting charge/discharge (3a) is sent from the host unit (host computer or parent unit) 3 to the adaptor 1 for communication, the adaptor 1 for communication starts operating when the voltage of the cell is larger than a minimum voltage after the discharge of the main cell of the portable terminal equipment 2 is finished (1a). The adaptor 1 terminates the discharging after the passage of a predetermined period of time (required for the discharging) from the start of discharging by which a predetermined amount of discharge is accomplished or after the voltage has dropped to an allowable voltage (minimum allowable voltage) while measuring the voltage of the main cell that is being discharged (1b). Following the discharging, the main cell of the portable terminal equipment 2 is charged by using a charger (2a). After the passage of a period of time by which the main cell is fully charged from a state of minimum voltage which does not inactivate the cell that has been measured in advance or after the voltage of the main cell has reached a charging completion voltage, the charging is terminated (2b). After the end of a series of charge/discharge operations, the adaptor 1 for communication sends a notice of completion of charge/discharge (3b) to the host unit 3. That is, the main cell voltage detector unit 108 compares the voltage with a reference voltage that has been stored in advance.

Figure 5:
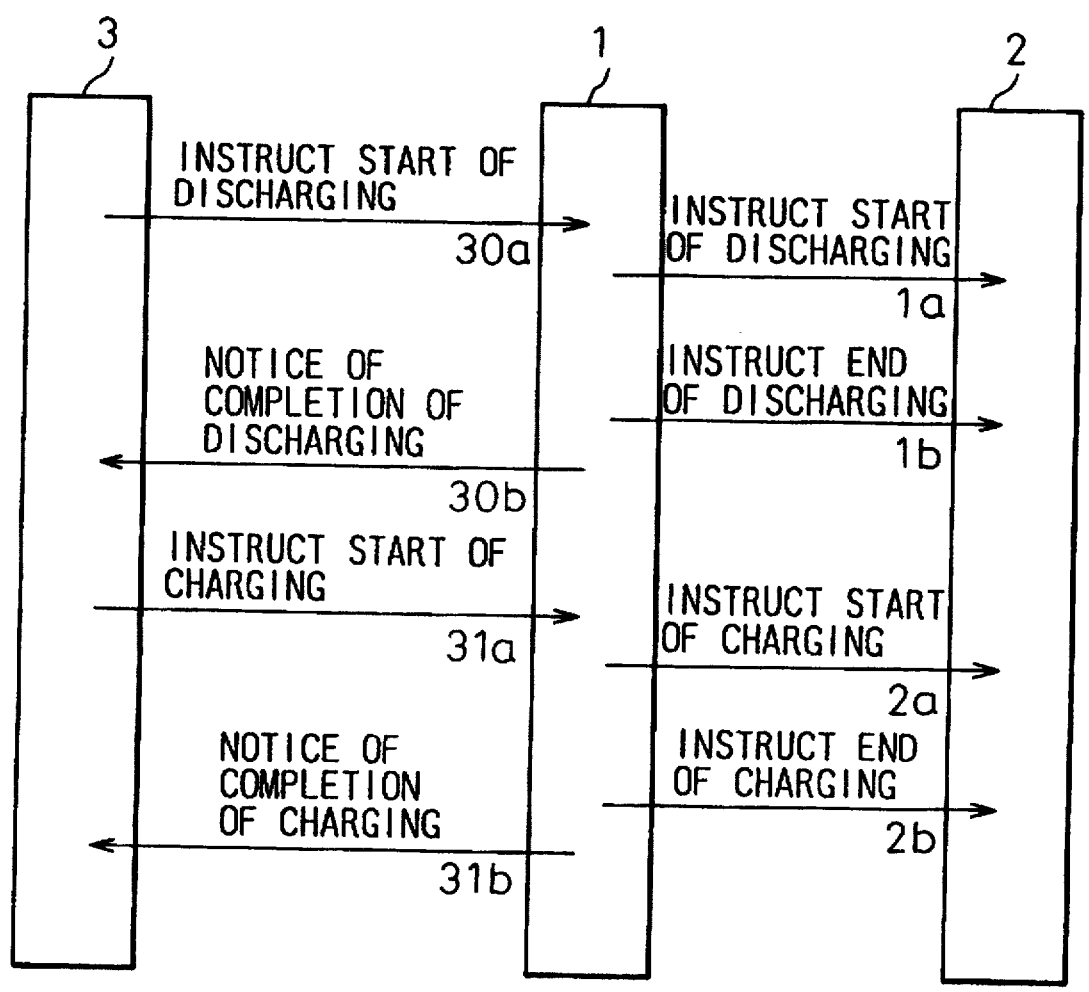
FIG. 5 is a diagram explaining charge/discharge processing according to a second embodiment of the present invention.

FIG. 5 illustrates a second embodiment of the present invention. When an instruction for starting the discharging (30a) is sent from the host unit 3 to the adaptor 1 for communication, the adaptor 1 for communication measures the voltage of the main cell, determines whether discharging is necessary or not, permits the main cell 208 of the portable terminal equipment 2 to be discharged by the discharger 105 when the voltage of the main cell is greater than a minimum voltage that does not cause the main cell to be inactivated (1a). The adaptor 1 terminates the discharging by the discharger 105 after the passage of a predetermined period of time in which the amount of discharge of the cell reaches the level of not inactivating the cell or when the voltage of the main cell has reached a voltage (minimum allowable voltage) after the amount of discharging has reached a predetermined amount of discharging of not inactivating the main cell (1b). The adaptor 1 for communication sends a notice of completion of discharging (30b) to the host unit 3. Upon receiving the notice of completion of discharging, the host unit 3 sends an instruction for starting the charging (31a) to the adaptor 1 for communication, and the charger 104 in the adaptor 1 for communication starts the charging operation (2a). The charging is terminated (2b) after the passage of a period of time, during which the voltage of the cell that has been measured in advance, changes from the voltage before being inactivated to the fully charged voltage, or after the voltage of the main cell has reached a charge completion voltage. After the end of the charging, the adaptor 1 for communication sends a notice of completion of charging (31b) to the host unit 3.

Figure 6:
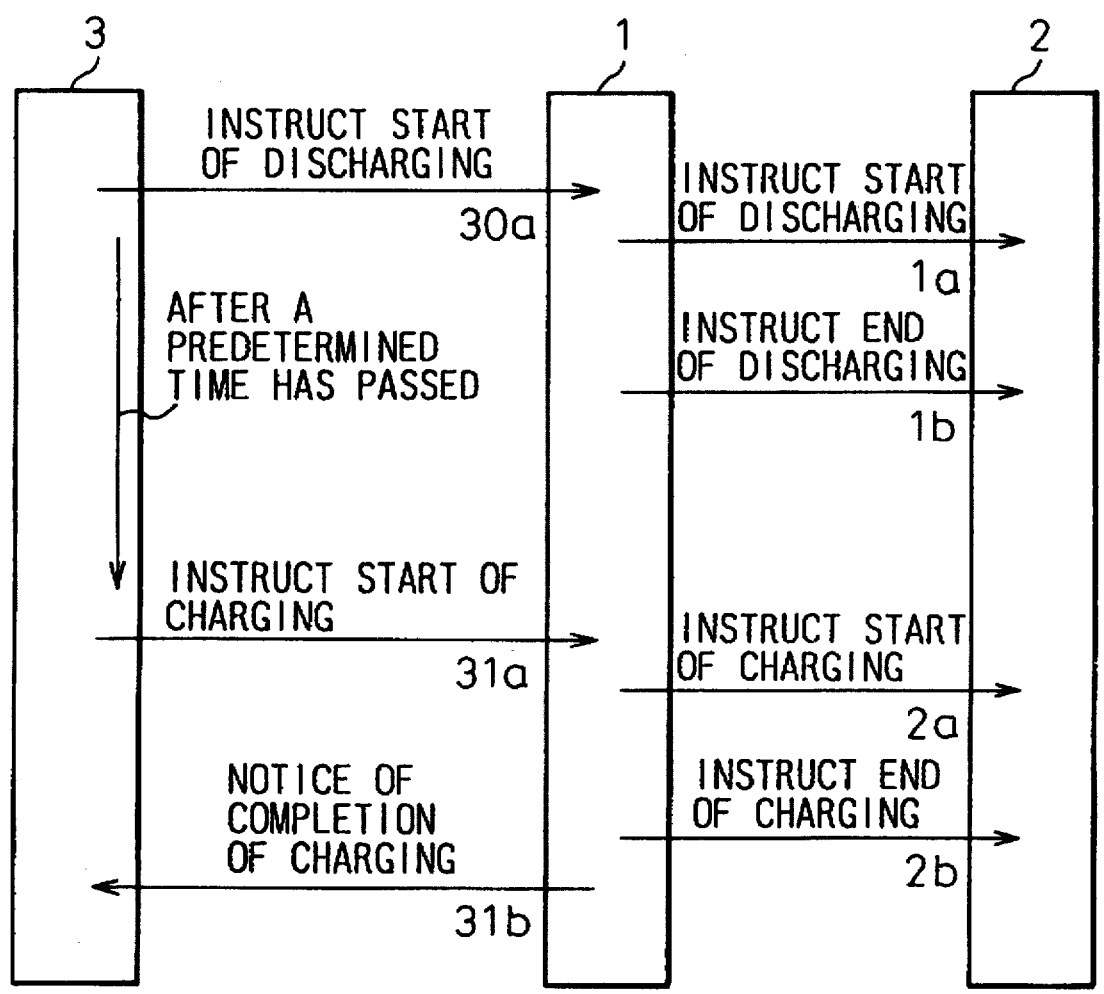
FIG. 6 is a diagram explaining charge/discharge processing according to a third embodiment of the present invention.

FIG. 6 illustrates a third embodiment of the present invention. As an instruction for starting the discharging (30a) is sent from the host unit 3 to the adaptor 1 for communication, as shown in FIG. 6, the adaptor 1 for communication permits the main cell 208 of the portable terminal equipment 2 to be discharged by the discharger 105 when the voltage of the main cell is greater than a minimum allowable voltage (1a). The adaptor 1 terminates the discharging by the discharger 105 after the passage of a predetermined period of time by which a predetermined amount of discharging is reached or after the voltage of the main cell 208 has reached a voltage (minimum allowable voltage) corresponding to a predetermined amount of discharging. After the passage of a predetermined period of time from the instruction for discharge (after the passage of this time, the host unit judges that the discharging of the main cell is finished and sends an instruction to the adaptor for communication, since the time needed for discharging was known in advance), an instruction for starting the charging (31a) is automatically sent from the host unit 3 to the adaptor 1 for communication, and the charging operation is started (2a) by the charger 104. After the passage of a period of time by which the main cell is fully charged from the predetermined voltage that has been measured in advance or after the voltage of the main cell has reached a charging completion voltage, the charging is terminated (2b). After the end of the charging, the adaptor 1 for communication sends a notice of completion of charging (31b) to the host unit 3.

When the discharging is not effected, only the instruction for starting the charging may be automatically sent to the adaptor 1 for communication from the host unit 3.

Figure 7:
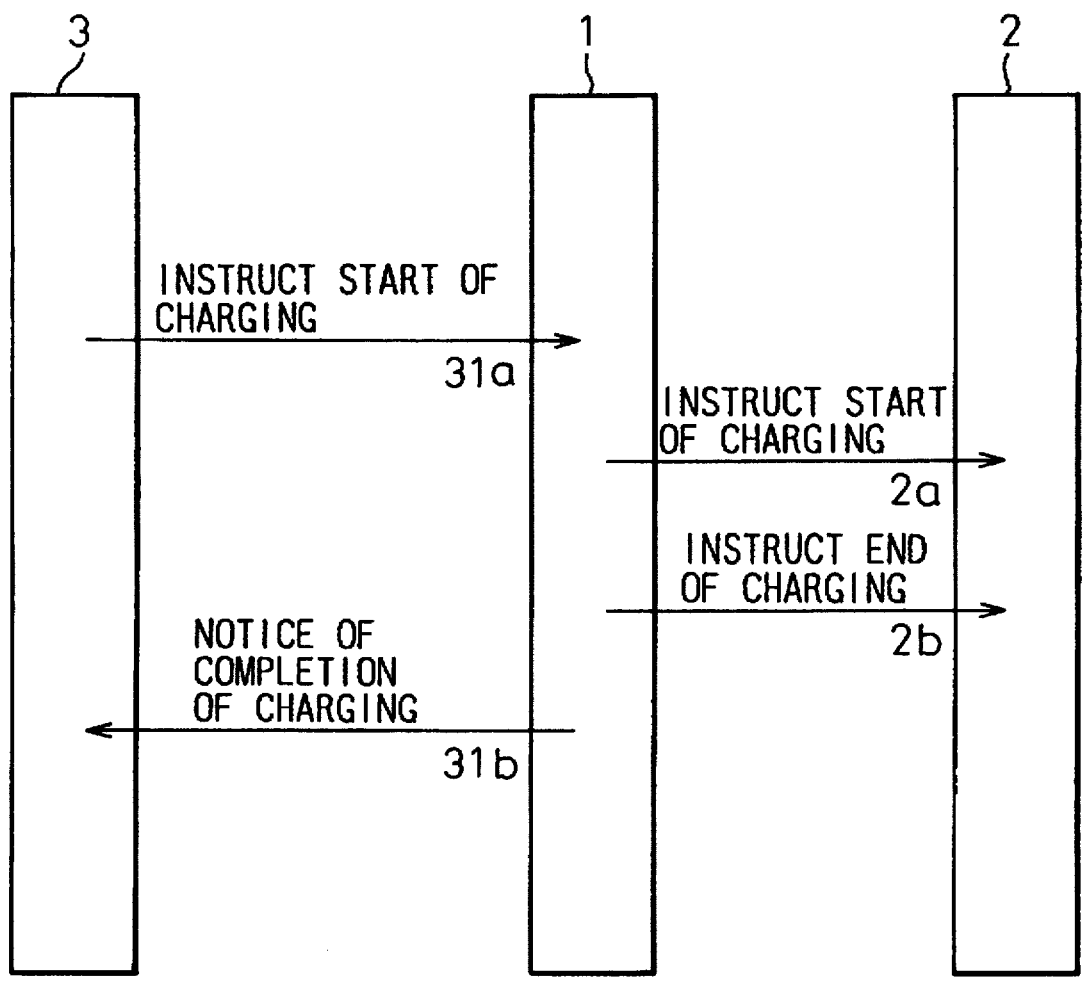
FIG. 7 is a diagram explaining charge processing according to a fourth embodiment of the present invention.

The state where the discharging is not effected represents a case where the voltage has already reached the discharge end voltage as a result of detecting the voltage or a case where the operator who is using a handy terminal provided in the adaptor for communication is not selecting the discharge function by a select switch. The processing where the discharging is not effected is shown in FIG. 7 as a fourth embodiment.

Figure 8:
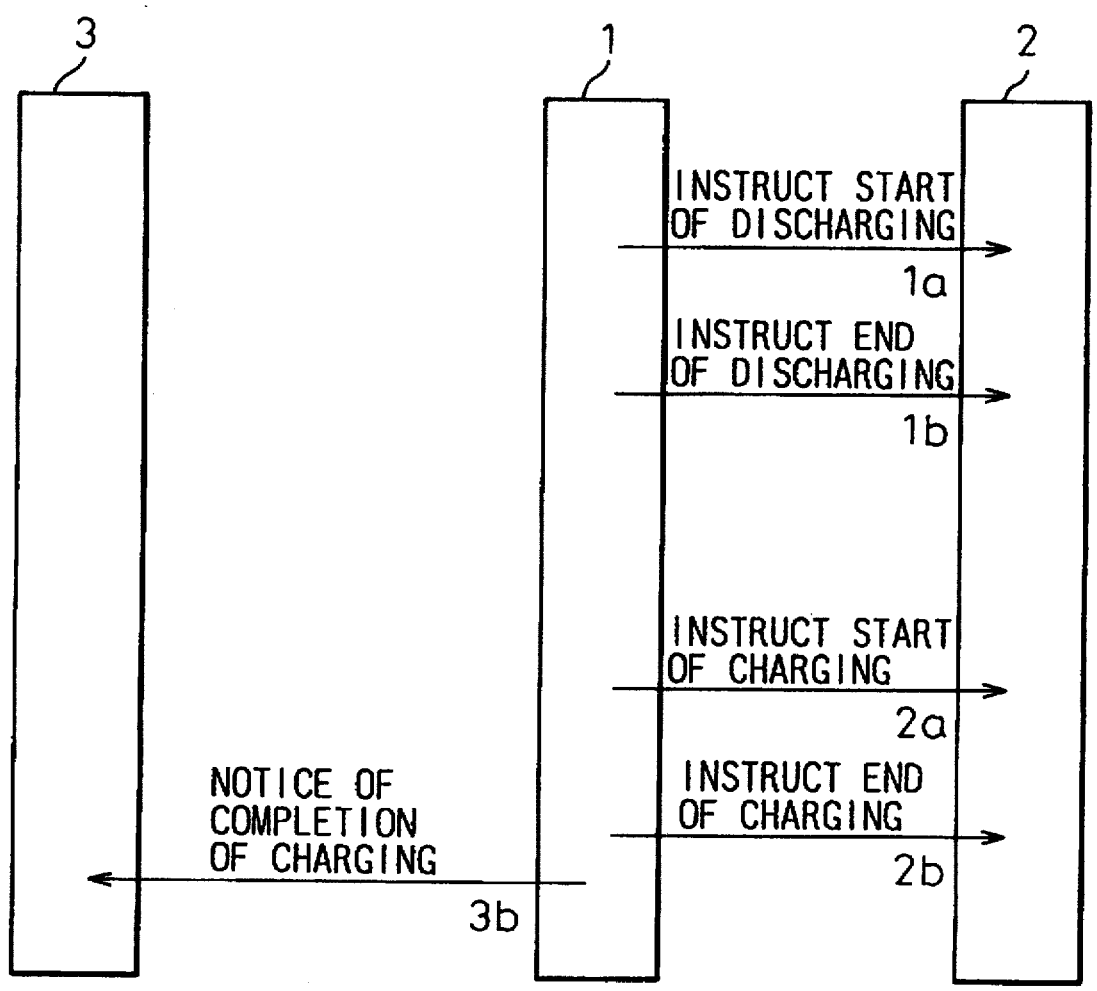
FIG. 8 is a diagram explaining charge/discharge processing according to a fifth embodiment of the present invention.

Instead of instructing the start of charge/discharge (3a) from the host unit 3, the charging function may be selected (instruction of discharge or charge) on the side of the adaptor 1 for communication and only the notice of completion of charge/discharge (3b) may be received by the host unit 3, in order to control the operation condition (to monitor the number of times of charging and discharging) of the main cell in the portable terminal equipment 2 from the host unit 3. The discharge function is selected by using a selection switch which is provided in the adaptor for communication and is manipulated by the operator who uses the handy terminal, whereby the host unit receives only the notice of completion of charge/discharge to determine the number of times of charging and discharging (to monitor the allowable numbers of times of charging and discharging). The processing in this case is shown in FIG. 8 as a fifth embodiment.

Figure 9:
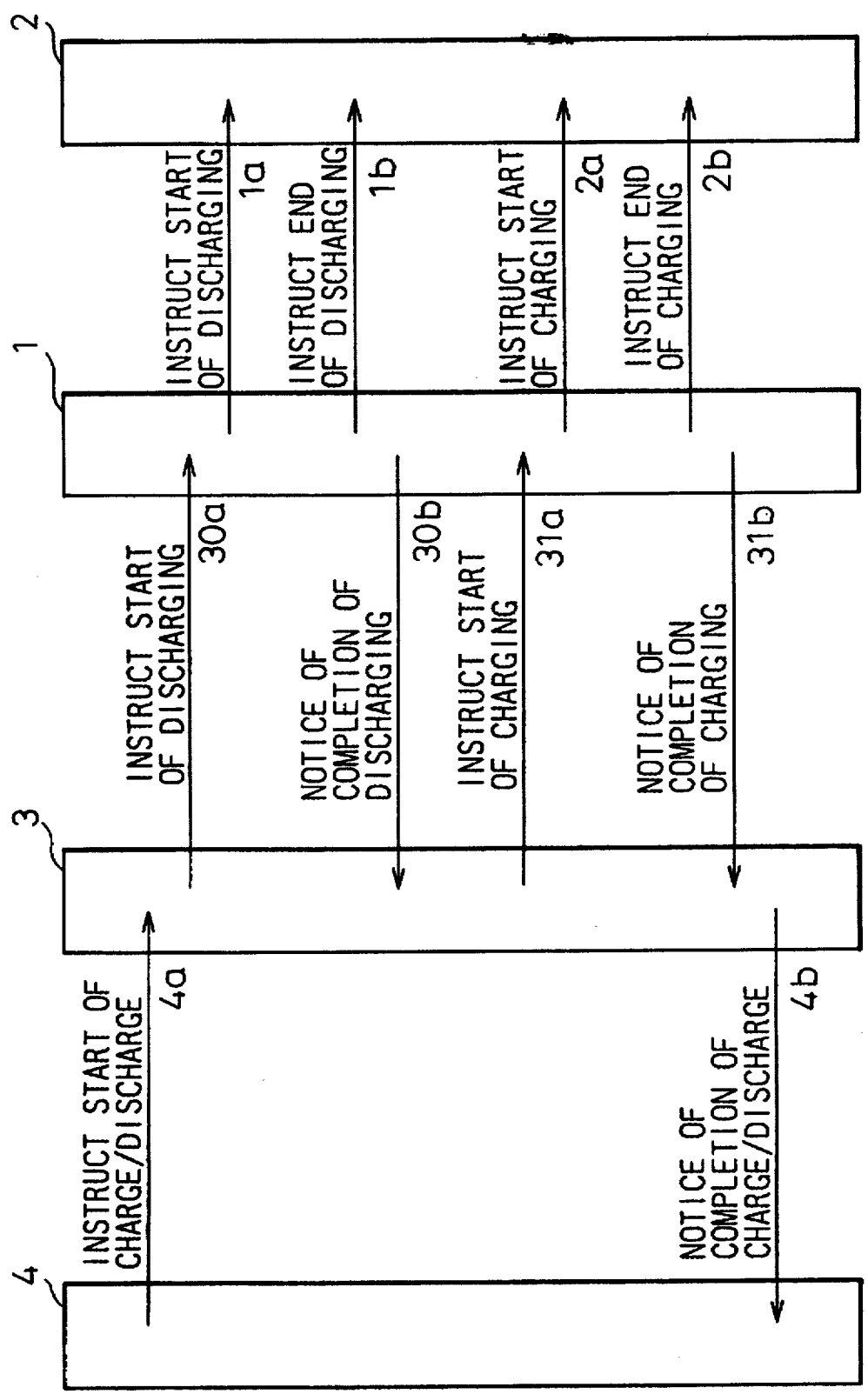
FIG. 9 is a diagram explaining charge/discharge processing according to a sixth embodiment of the present invention.

FIG. 9 illustrates a sixth embodiment for when the charge/discharge processing is controlled by the high-level host unit (head office host computer) 4 via the host unit 3. When a charge/discharge start instruction (4a) is sent from the host unit 4 to the host unit 3, an instruction for starting the discharging (30a) is sent from the host unit 3 to the adaptor 1 for communication, the discharger 105 in the adaptor 1 for communication starts discharging the main cell of the portable terminal equipment 2 (1a) and terminates the discharging after the passage of a predetermined period of time by which a predetermined amount of discharging is reached or when a voltage is reached after the main cell is discharged by a predetermined amount (1b). After the end of the charging, a notice of completion of discharging (30b) is sent from the adaptor 1 for communication to the host unit 3.

When an instruction for starting the charging (31a) is sent from the host unit 3 to the adaptor 1 for communication upon receiving the notice of completion of discharging, the adaptor 1 for communication starts electrically charging the main cell of the portable terminal equipment 2 (2a) and terminates the charging after the passage of a predetermined period of time or after a predetermined voltage is reached (2b). After the end of charging, the adaptor 1 for communication sends a notice of completion of charging (31b) to the host unit 3, and the host unit 3 informs the high-order host unit 4 of the completion of a series of charge/discharge operations by sending a notice of completion of charge/discharge (4b).

Figure 10:
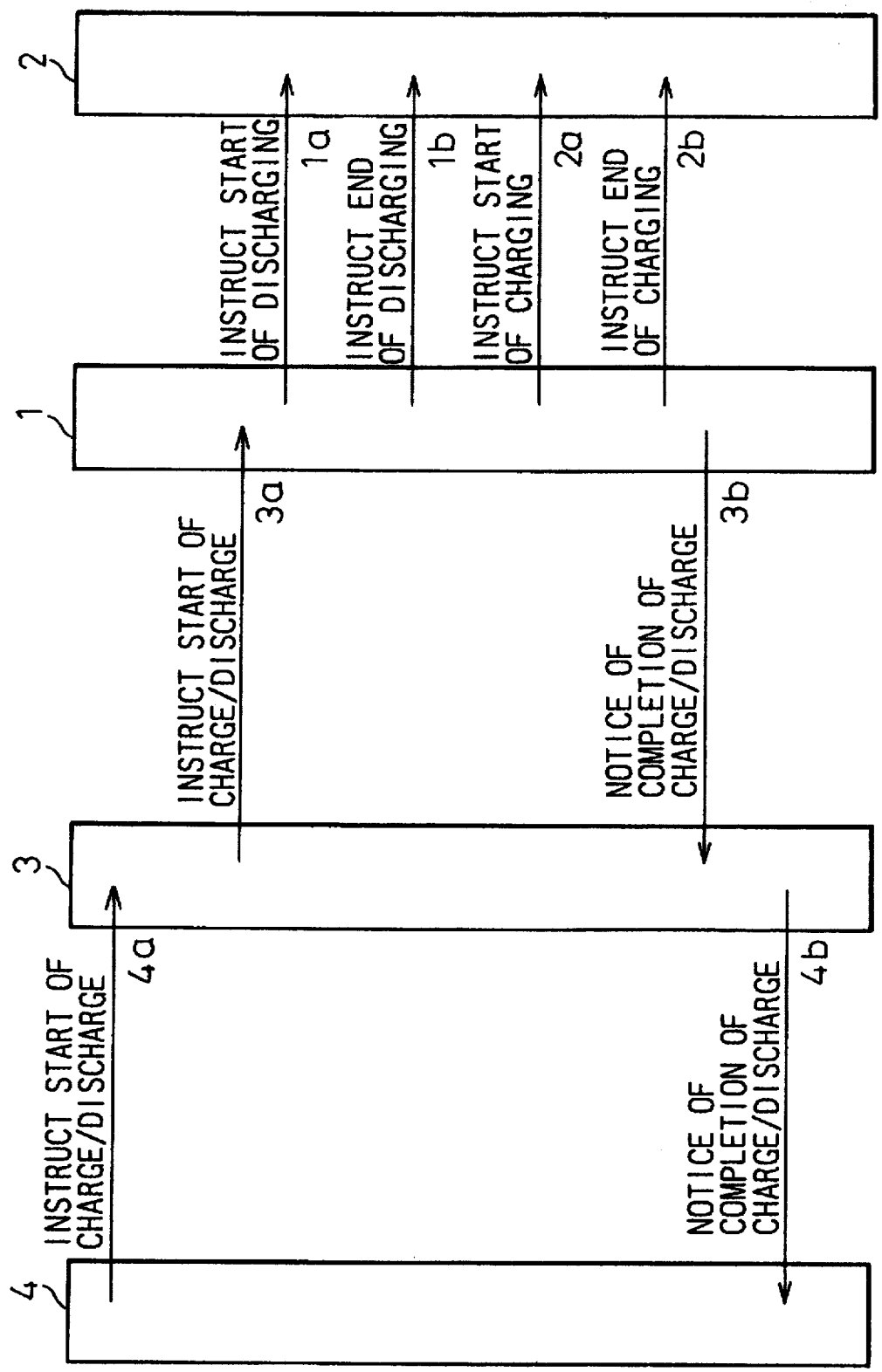
FIG. 10 is a diagram explaining charge/discharge processing according to a seventh embodiment of the present invention.

FIG. 10 illustrates a seventh embodiment which starts charging even when the terminal equipment receives no instruction for charging. When an instruction for starting charge/discharge (4a) is sent from the host unit 4 to the host unit 3, the host unit 3 sends an instruction for starting charge/discharge (3a) to the adaptor 1 for communication, whereby the discharger 105 in the adaptor 1 for communication starts discharging the main cell of the portable terminal equipment 2 (1a) and terminates the discharging after the passage of a predetermined period of time in that the cell is still slightly activated or when the cell is still slightly activated (1b). Following the discharging, the charging of the main cell of the portable terminal equipment 2 is started (2a). When the charging is terminated after the passage of a time necessary for the discharging that was known in advance (2b), the adaptor 1 for communication sends a notice of completion of charge/discharge (3b) to the host unit 3. The host unit 3 then informs the high-order host unit 4 of the completion of charge/discharge (4b) to signal the end of a series of charge/discharge operations.

Figure 11:
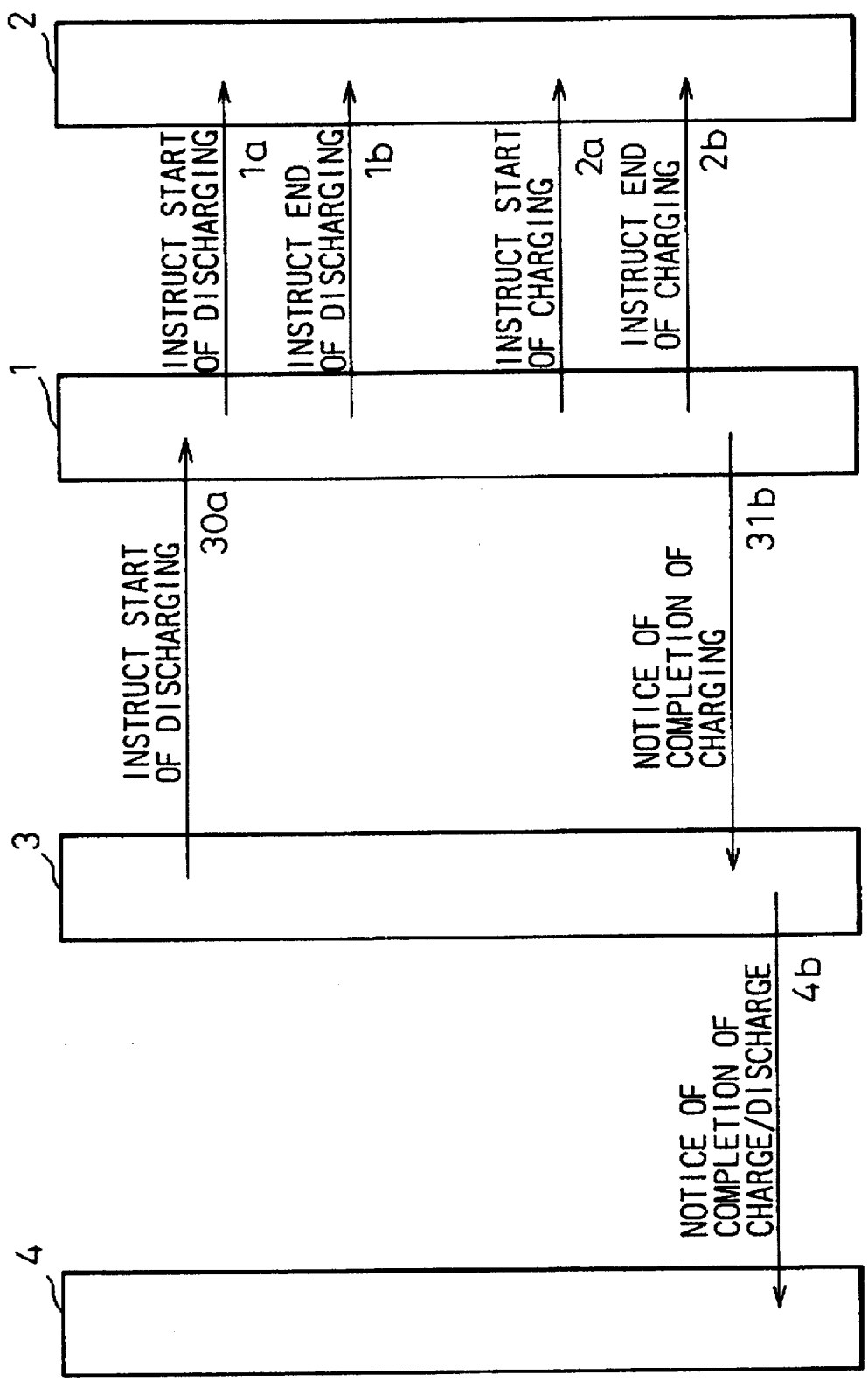
FIG. 11 is a diagram explaining charge/discharge processing according to an eighth embodiment of the present invention.

FIG. 11 illustrates an eighth embodiment in which the host unit 4 does not issue an instruction for starting charge/discharge (4a) but the host unit 3 issues an instruction for starting charge/discharge via the adaptor 1 for communication, or the adaptor 1 for communication directly issues the instruction for starting charge/discharge, so that the discharger 105 starts discharging the main cell (1a). The adaptor 1 terminates the discharging after the passage of a predetermined period of time during which a predetermined amount of discharging is reached or when the discharging voltage corresponding to a predetermined amount of discharging is reached (1b). Following the discharging, charging of the main cell of the portable terminal equipment 2 is started (2a) and is then terminated after the passage of a predetermined period of time by which a predetermined amount of charging is accomplished or when a voltage is reached after the cell is charged by a predetermined amount (2b). After the end of charging, the adaptor 1 for communication sends a notice of completion of charging (31b) to the host unit 3 which then sends a notice of completion of charging (4b) to the host unit 4. Therefore, the number of times of charging (notice of completion is counted for each terminal equipment) can be counted by the host unit 4, by the host unit 3 or by the adaptor for communication, and the operation condition of the main cell can be controlled. The number of times of charging can be counted based upon not only the notices of completion of charge/discharge but also other factors.

Figure 13:
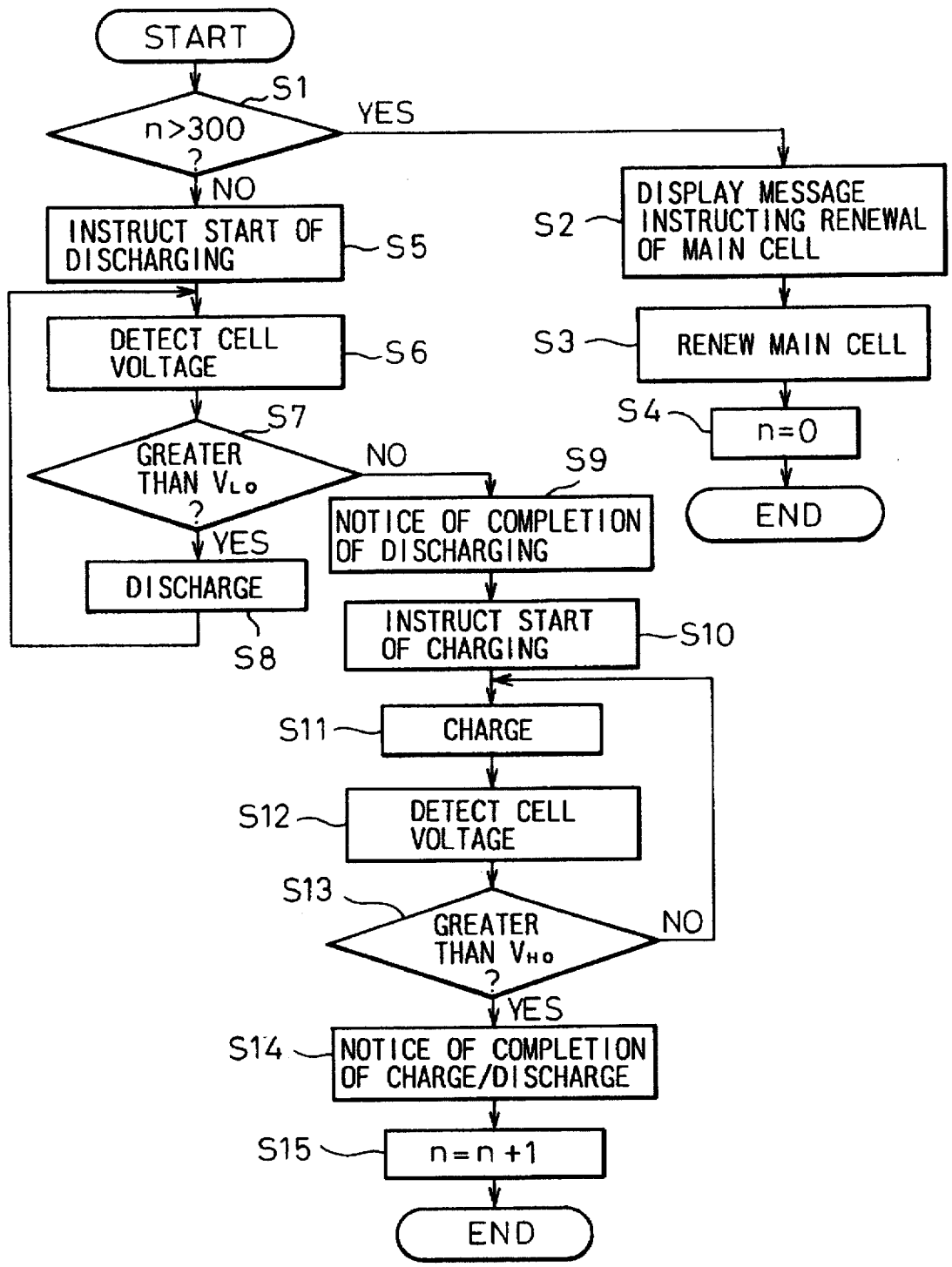
FIG. 13 is a flow chart explaining the detection of voltage and charge/discharge operation according to an embodiment of the present invention.

FIG. 13 is a diagram illustrating the flow of voltage detection and charge/discharge processing according to an embodiment of the present invention. First, the host unit stores the number of times of charge/discharge for each terminal equipment, and checks whether the number of times n of charge/discharge of the main cell of the terminal equipment connected to the adaptor for communication has exceeded 300 times or not. When the number of times has exceeded 300 times (yes in step S1), the host unit sends a message to the adaptor for communication stating that the number of times has exceeded 300 times, and a message is displayed on the display unit 104 instructing that the main cell be renewed (S2). When the operator renews the main cell after seeing this message (S3), the adaptor for communication informs the host unit of the fact that the cell is renewed. Based upon this information, the host unit clears the number of times n of charge/discharge of the corresponding terminal equipment (S4).

When the number of times n of charge/discharge is smaller than 300 at the step S1, an instruction for starting the discharging is issued (S5). The voltage of the main cell is detected by the main cell voltage detector unit 108 of the adaptor for communication (S6). When the cell voltage is greater than a predetermined voltage $V_{LO}$, the adaptor for communication controls the charge/discharge control unit 109 to start charging the main cell (S8) and the program returns back to the step S6. When the voltage of the main cell is smaller than $V_{LO}$ or is smaller than $V_{LO}$ as a result of discharging, the program proceeds to step S9 where the completion of discharge is displayed on the display unit 107 of the adaptor for communication. Then, an instruction for starting the charging is issued from the charge/discharge control unit to the charger (S10), the main cell of the adaptor for communication is charged by the charger in accordance with the instruction (S11), the voltage of the main cell is detected by the main cell voltmeter (S12), the program returns back to the step 11 when the voltage is smaller than a predetermined voltage $V_{HO}$ (no in S13), and the notice of completion of charging is sent to the host unit 3 (S14) when the voltage of the main cell which is being charged is greater than $V_{HO}$ (yes in S13). At step 15, the host unit ends the charge/discharge processing by adding 1 to the number of times of charge/discharge of the terminal equipment that is charged.

Described below is a method of letting the operator know the time to renewing the cell. The host unit stores the number of times of charge/discharge for each of the portable terminal equipment, and counts the number of charge/discharge based upon the notices of completion of charge/discharge from the adaptor for communication. When the number of times of charge/discharge reaches a predetermined number of times (300 times in the case of a nickel-cadmium cell), the host unit sends an instruction to the adaptor for communication to which the portable terminal equipment is connected so as to display a message for renewing the main cell. Referring to FIG. 2, when the terminal equipment is connected to the adaptor for communication, the ID (identification) number of the portable terminal equipment is transmitted to the host unit from the terminal equipment together with the collected data via the adaptor for communication. This enables the host unit to confirm the terminal equipment that is connected. When the notice of completion of charge/discharge is received from the adaptor for communication after the end of a series of charge/discharge operations, the host unit updates the number of times of charge/discharge of the portable terminal equipment of the corresponding ID number. To effect the charge/discharge in the next time, the host unit judges whether the number of times of charge/discharge corresponding to the ID number of the terminal equipment that is connected has reached the above-mentioned predetermined number of times or not. When the predetermined times is reached, the instruction for starting charge/discharge is not issued to the adaptor for communication but, instead, a message is sent to the portable terminal equipment via the adaptor for communication and is displayed on the display unit to cause the main cell be renewed. When the main cell is renewed, a notice of this fact is sent from the adaptor for communication to the host unit which then clears the number of times of charge/discharge of the portable terminal equipment.

According to the present invention, the adaptor for communication that executes communication by connecting the portable terminal equipment and the host unit together is provided with a function for charging and discharging the main cell of the portable terminal equipment, and is controlled by the host unit making it possible to prevent the main cell in the portable terminal equipment from being inactivated.

In order to effect the charge/discharge operation in accordance with an instruction from the host unit without overlap of the regular communication between the portable terminal equipment and the host unit, the number of times of charge/discharge is counted on the side of the host unit to control the life of the cell. Furthermore, since the charge/discharge state can be controlled by a head office computer connected as the high-level host unit for the host unit, the life of the nickel-cadmium cell can be controlled by the head office, and the time for renewing the cell in the portable terminal equipment can be instructed to the operator.

We claim:

1. A charge/discharge control device which is connected to terminal equipment which has a secondary cell, to which a drive power is given from said secondary cell, and electrically charges and discharges said secondary cell, comprising:

a voltage measuring means for measuring the voltage of said secondary cell;

a discharging means for discharging the voltage of said secondary cell; and a charging means for charging said secondary cell, wherein the voltage of said secondary cell is measured by said voltage measuring means prior to charging said secondary cell, wherein when the voltage of said secondary cell is larger than a predetermined voltage, said secondary cell is discharged by said discharging means and is then charged by said charging means, and wherein when the voltage of said secondary cell is smaller than the predetermined voltage, said secondary cell is charged by said charging means without being discharged by said discharging means.

2. A charge/discharge control device having a charge/discharge function for charging and discharging a secondary cell by connecting a terminal equipment driven by said secondary cell to a first host unit, comprising:

a discharging means for discharging said secondary cell upon receiving an instruction from said first host unit; and, a charge/discharge control unit which discharges said secondary cell by said discharging means and, when the voltage of said secondary cell is discharged down to a predetermined voltage, discontinues the discharging and starts the charging and, when the voltage of said secondary cell after the start of charging reaches a predetermined charging voltage, discontinues the charging and informs said first host unit of the completion of charging.

3. An adapter for communication, having a charge/discharge function, for executing communication by connecting a terminal equipment driven by a secondary cell to a first host unit, comprising a discharging means for discharging said secondary cell upon receiving an instruction from said first host unit, and a charging means for charging said secondary cell upon receiving an instruction from said first host unit.

4. A charge/discharge control method in a system having a first host unit, a terminal equipment driven by a secondary cell, and a charge/discharge control device connected thereto, said charge/discharge control method comprising:

a step for sending a charge/discharge start instruction to the charge/discharge control device from said first host unit;

a step for starting the discharging of the secondary cell in said terminal equipment by the charge/discharge control device;

a step for terminating the discharging when the voltage of the secondary cell reaches a predetermined voltage after the passage of a predetermined period of time;

a step for starting the charging of said secondary cell following the discharging;

a step for terminating the charging when the voltage of the secondary cell reaches a predetermined voltage after the passage of a predetermined period of time; and a step for sending a notice of completion of charge/discharge to the first host unit from the charge/discharge control device after the charging is terminated.

5. A charge/discharge control method as set forth in claim 4, wherein the discharge in the step for starting the discharging of the secondary cell in said terminal equipment by the charge/discharge control device, starts when a voltage of the secondary cell is higher than a predetermined voltage.

6. A charge/discharge control method in a system having a first host unit, a terminal equipment driven by a secondary cell, and a charge/discharge control device connected thereto, said charge/discharge control method comprising:

a step for starting the discharging of the secondary cell in said terminal equipment by the charge/discharge control device;

a step for terminating the discharging when the voltage of the secondary cell reaches a predetermined voltage after the passage of a predetermined period of time;

a step for starting the charging of said secondary cell following the discharging;

a step for terminating the charging when the voltage of the secondary cell reaches a predetermined voltage after the passage of a predetermined period of time; and a step for sending a notice of completion of charge/discharge to the first host unit from the charge/discharge control device after the charging is terminated.

7. A charge/discharge control method in a system having a first host unit, a terminal equipment driven by a secondary cell, and a charge/discharge control device connected thereto, said charge/discharge control method comprising:

a step for sending an instruction for starting charge/discharge to the charge/discharge control device from said first host unit;

a step for starting the discharging of the secondary cell in said terminal equipment by the charge/discharge control device;

a step for finishing the discharging when the voltage of the secondary cell reaches a predetermined voltage after the passage of a predetermined period of time;

a step for informing the completion of discharging to the first host unit from the charge/discharge control device;

a step for sending an instruction for starting the charging to the charge/discharge control device from the first host unit;

a step for starting the charging of the secondary cell by the charge/discharge control device;

a step for finishing the charging when the voltage of the secondary cell reaches a predetermined voltage after the passage of a predetermined period of time; and a step for sending a notice of completion of charging to the first host unit from the charge/discharge control device.

8. A charge/discharge control method as set forth in claim 7, wherein the discharge in the step for starting the discharging of the secondary cell in said terminal equipment by the charge/discharge control device, starts when a voltage of the secondary cell is higher than a predetermined voltage.

9. A charging method by which a terminal equipment, which has a secondary cell and to which driving power is provided from the secondary cell, is charged by connecting a charge control device thereto wherein, in effecting the electric charging by said charge control device, the charge control device checks the number of times of charging effected thus far for the secondary cell in said terminal equipment before starting the charging of secondary cell, electrically charges said secondary cell after an electrical discharging of said secondary cell is completed when the number of times of charging is smaller than a predetermined number of times, adds 1 to the number of times of charging when the charging of said secondary cell is finished, and does not electrically charge said secondary cell when the number of times of charging has reached the predetermined number of times.

10. A charging method as set forth in claim 9, wherein said terminal equipment detects a voltage of said secondary cell before starting the discharging of said secondary cell, discharging said secondary cell if the voltage of said secondary cell is greater than a predetermined voltage, and charging said secondary cell without discharging said secondary cell if the voltage of said secondary cell is smaller than the predetermined voltage.

* * * * *